Patented Oct. 23, 1945

2,387,385

UNITED STATES PATENT OFFICE 2,387,385

COPOLYMERS

Albert M. Clifford, Stow, Ohio, assignor to Wingfoot Corporation, Akron, Ohio, a corporation of Delaware No Drawing. Application February 27, 1941,
Serial No. 380,813

10 Claims. (Cl. 260—84.5)

This invention relates to interpolymerized mixtures of two or more monomeric materials and, more particularly, to copolymers having improved extrusion characteristics.

In the manufacture of synthetic rubber, butadiene and acrylonitrile have been polymerized together to yield rubber-like masses having many of the properties of natural rubber and being useable in place thereof for a number of purposes. The synthetic rubber prepared from these two monomers does, however, suffer in comparison with natural rubber in one respect, namely, its plasticity. It will be apparent that rubber must be sufficiently soft to be worked on a rubber mill or the like so that it can be compounded with sulfur, carbon black, zinc oxide, accelerators, and other ingredients which must be incorporated before curing. A material which is so stiff that it cannot readily be worked either involves extended processing during compounding or must receive additional treatment to soften it.

In an attempt to overcome this objection to butadiene-acrylonitrile rubbers, it has been found that, if the acrylonitrile monomer be wholly or partly replaced by an alpha alkyl substituted acrylonitrile containing at least five carbon atoms in the molecule, a rubber is obtained which has much greater plasticity. Ethacrylonitrile is preferred for this purpose but there may also be employed other homologues such as alpha isobutyl acrylonitrile and alpha tertiary butyl acrylonitrile. The butadiene constituent of the copolymer may be replaced by other butadienes such as isoprene, 2,3-dimethyl-1,3 butadiene, chloroprene, etc., especially the hydrocarbon butadienes, among which 1,3-butadiene is preferred.

It is not necessary that the acrylonitrile be completely replaced by ethacrylonitrile or other homologous acrylonitrile but the replacement may be partial with good results. Thus, the invention includes copolymers of three constituents, such as butadiene, acrylonitrile and ethacrylonitrile. The proportion of each monomer may be varied within wide limits, say from 10.50% of the mixture being a homologue of the acrylonitrile. The proportions of the particular butadiene employed and of the acrylonitrile may be varied as desired, the proportion of the butadiene constituent being usually kept at a maximum consistent with good properties in the rubber due to the fact that it is the least expensive constituent.

The copolymers are prepared in substantially the same manner as that now employed in preparing butadiene-acrylonitrile copolymers, preferably in an aqueous emulsion. While it is not intended to limit the preparation to any particular procedure, it may be said that such aqueous emulsions usually contain the monomers, an emulsifying agent, an oxidant and a promoter. Other means of polymerization may also be employed.

The improved plasticity of the new copolymers was compared with that of butadiene-acrylonitrile copolymers by an extrusion test. This test involves forcing a sample of the rubber through an orifice of certain characteristics under a definite constant pressure until a more or less constant quantity of rubber has been extruded. The volume of rubber extruded per unit of time then gives the extrusion rate. Specifically, one such testing apparatus consists of a cup in which a quantity of the rubber to be tested is placed. The rubber is maintained at a temperature of 92° C. while a pressure of 200 pounds per square inch is applied thereto. The orifice has an area of 10 sq. mm. and a depth of 0.120 inch. The rubber is maintained under the specified pressure until the extruded portion is approximately ¾ inch long. The volume is then measured and divided by the time required, the result giving the number of cubic mm. extruded per minute. Where the samples to be compared have nearly the same specific gravity, the extruded portion may be weighed and the result recorded in grams per minute.

The new copolymers are not only more easily processed in the preparation of articles therefrom but increased yields may be obtained from the polymerization of a given quantity of monomers. This is for the reason that copolymerization cannot ordinarily be carried to completion because the rubber so obtained is so hard and tough as to be practically incapable of mastication on the rubber mill or other apparatus. Hence, it is customary to stop the polymerization by well known means, such for example as by the addition of phenyl beta naphthylamine, short of about 60% yield. By the replacement of acrylonitrile in whole or in part with one of its homologues containing at least five carbon atoms, it is possible to continue the polymerization above 60%, suitable plastic rubbers being obtained with yields of 75% and even higher.

To illustrate the properties of the present copolymers as compared with those now available, samples of a butadiene-acrylonitrile rubber and of a butadiene-ethacrylonitrile rubber were prepared and tested under the same conditions. The ingredients of each rubber were polymerized in an emulsion containing the following constituents:

| | | |
|---|---|---|
| Butadiene | pounds | 2.8 |
| Acrylo- or α-ethyl acrylonitrile | do | 1.2 |
| Water | do | 5.0 |
| Aquarex D (Na lauryl sulfate) | grams | 113.0 |
| Acetic acid | do | 8.5 |
| NaH$_2$PO$_4$ | do | 20.3 |
| NaBO$_3$.4H$_2$O | do | 30.0 |
| CCl$_4$ | do | 51.0 |

The emulsion in each instance was agitated in a glass-lined autoclave at a temperature of 100° F. until a latex of solids content amounting to about 30-33% and corresponding to a 70-75% yield was obtained.

The physical characteristics of these copolymers are compared in the accompanying table. The extrusion values are data obtained from tests conducted at 400 lbs./sq. in. pressure on the raw, uncompounded copolymer. The other data pertain to the copolymer after compounding and curing for various periods of time as indicated, and are data which are commonly obtained in evaluating the properties of cured natural rubber. The rebound values show that all of the rubbers were elastic, despite the fact that one was more plastic than the others.

| Cure mins. 260° F. | Tens., kg/cm.² | Elong., percent | Mod. 300% | Extrusion at 400# | Shore hardness | Percent rebound |
|---|---|---|---|---|---|---|
| BUTADIENE-α-ETHYLACRYLONITRILE ||||||||
| 50 | 34 | 1,075 | 12 | 0.4505 | 61 | 54.5 |
| 70 | 141 | 960 | 24 | | | |
| 100 | 197 | 740 | 41 | | | |
| 140 | 205 | 670 | 50 | | | |
| BUTADIENE-ACRYLONITRILE ||||||||
| 35 | 204 | 475 | 112 | .0092 | 79 | 53.5 |
| 50 | 246 | 390 | 174 | | | |
| 70 | 212 | 335 | 200 | | | |
| 100 | 226 | 315 | 210 | | | |
| 140 | 226 | 295 | | | | |
| BUTADIENE-ACRYLONITRILE ||||||||
| 35 | 162 | 440 | 110 | .0152 | 77 | 58.0 |
| 50 | 184 | 360 | 148 | | | |
| 70 | 191 | 310 | 188 | | | |
| 100 | 196 | 295 | | | | |
| 140 | 206 | 290 | | | | |

It will be observed from the foregoing table that the ethacrylonitrile copolymer is many times more extrudable than the corresponding acrylonitrile copolymers. In each case, the Shore hardness and rebound determinations were measured on the 100 minute cure for each sample.

In another operative test the butadiene and the nitrile were copolymerized in 75/25 ratio, the polymerization being continued for 23 hours at a temperature of 38° C. The results obtained were as follows, the extrusion being measured in this instance for a pressure of 200 pounds per square inch on the raw stock.

| Percent yield | Cure | Tens. | Elong. | Modulus | Ext. at 200# | Percent rebound |
|---|---|---|---|---|---|---|
| BUTADIENE-α-ETHACRYLONITRILE, 75/25 RATIO, RUN 23 HRS. @ 38° |||||||
| 69.7 | 35/260 | 94 | 885 | 16 | .086 | 61 |
|  | 50 | 230 | 675 | 47 | | |
|  | 70 | 200 | 545 | 62 | | |
|  | 100 | 180 | 490 | 64 | | |
| BUTADIENE-ACRYLONITRILE |||||||
| 78.1 | 35/260 | 161 | 630 | 50 | 0.018 | 60.0 |
|  | 50 | 202 | 570 | 83 | | |
|  | 70 | 196 | 425 | 108 | | |
|  | 100 | 187 | 420 | 104 | | |

Here, again, the ethacrylonitrile copolymer possessed an extrusion value several times that registered by the acrylonitrile copolymer.

The beneficial effect of alpha alkyl acrylonitriles having at least five carbon atoms in the molecule may be obtained, as mentioned, by only partial replacement of acrylonitrile in butadiene-acrylonitrile type copolymers, the resulting products showing a progressively increasing plasticity as the proportion of the acrylonitrile homologue is increased. In this way, any desired plasticity may be achieved, an optimum range being from .08 to .30 measured under a pressure of 200 pounds per square inch and the conditions previously specified. Addition of the homologous acrylonitrile also makes possible increased yields in proportion as it is present, due to the fact that the polymerization may be pushed nearer completion. The following tabulation shows how suitable plasticity may be achieved by the use of ethacrylonitrile in a butadiene-acrylonitrile system. The hydrogen ion concentration in each instance was maintained between about pH 7 and pH 8 while the temperature was 38° C. Sodium perborate, $NaBO_3 \cdot 4H_2O$, was the oxidant, 3.3% of the weight of the monomers being used.

| Ratio | Hours | Yield | Cure | Tens. | Elong. | Mod. | Extrusion |
|---|---|---|---|---|---|---|---|
| BUTADIENE-ETHACRYLONITRILE-ACRYLONITRILE ||||||||
| 70/0/30 | 18 | 84.5 | 35/260 | 221 | 620 | 62 | 0.007 |
| | | | 50 | 233 | 505 | 88 | |
| | | | 70 | 234 | 460 | 108 | |
| | | | 100 | 245 | 455 | 110 | |
| 70/7.5/22.5 | 19 | 80.3 | 35/260 | 153 | 760 | 28 | 0.060 |
| | | | 50 | 206 | 645 | 48 | |
| | | | 70 | 240 | 600 | 67 | |
| | | | 100 | 245 | 580 | 69 | |
| 70/15/15 | 26 | 75.4 | 35/260 | 188 | 830 | 34 | 0.248 |
| | | | 50 | 222 | 650 | 56 | |
| | | | 70 | 250 | 605 | 74 | |
| | | | 100 | 252 | 575 | 79 | |
| 70/30/0 | 29 | 66.8 | 35/260 | 72 | 1,000 | 16 | 6.51 |
| | | | 50 | 138 | 685 | 36 | |
| | | | 70 | 166 | 620 | 48 | |
| | | | 100 | 159 | 585 | 52 | |

Rebound for the samples varied between 53 and 57.5%, indicating that each sample possessed about the same elasticity. It will be observed that the extrusion value was very low for a copolymer of butadiene and acrylonitrile in the ratio of 70/30 but increased rapidly as ethacrylonitrile was used to replace a part of the acrylonitrile, achieving a maximum when all of the acrylonitrile had been replaced.

Similar results may be obtained by replacing part or all of the acrylonitrile with other homologous acrylonitriles, such as alpha propyl acrylonitrile, alpha isopropyl acrylonitrile, alpha isobutyl acrylic nitrile and alpha tertiary butyl acrylonitrile. In each case, copolymers of the butadiene-acrylonitrile type may be modified to obtain a product having increased plasticity, the plasticity varying from one to fifty times that of a copolymer containing no homologous acrylonitrile and prepared under the same conditions with the same yield. From another aspect, the invention makes it possible to secure synthetic rubbers of this type in yields of over 60% of the theoretical while still maintaining the plasticity sufficiently high to permit the rubber to be worked.

While there have been described above the preferred embodiments of the invention, it will be apparent to those skilled in the art that various modifications and changes may be made therein without departing from the spirit of the invention or from the scope of the appended claims.

I claim:

1. Copolymers comprising a butadiene and an alpha alkyl acrylonitrile containing at least five carbon atoms in the molecule polymerized together.

2. Copolymers comprising a hydrocarbon butadiene and an alpha alkyl acrylonitrile containing at least five carbon atoms in the molecule polymerized together.

3. Copolymers comprising butadiene and an alpha alkyl acrylonitrile containing at least five carbon atoms in the molecule polymerized together.

4. Copolymers comprising a butadiene and ethacrylonitrile polymerized together.

5. Copolymers comprising butadiene and ethacrylonitrile polymerized together.

6. A copolymer of butadiene and an alpha alkyl acrylonitrile containing at least five carbon atoms in the molecule.

7. A copolymer of butadiene and ethacrylonitrile.

8. A copolymer of butadiene, acrylonitrile and ethacrylonitrile.

9. A rubber-like copolymer of a butadiene and an alpha alkyl acrylonitrile containing at least five carbon atoms in the molecule, said copolymer having a plasticity from one to fifty times that of a copolymer of butadiene and acrylonitrile of the same proportions and polymerized to the same degree of completion.

10. A rubber-like copolymer of a butadiene and an alpha alkyl acrylonitrile containing at least five carbon atoms in the molecule polymerized to at least sixty percent of completion and being workable under the same conditions as natural rubber.

ALBERT M. CLIFFORD.